United States Patent

[11] 3,589,163

| [72] | Inventors | John J. Byrne<br>Canton, Ohio;<br>Ignatius J. Niemkiewicz, Wilmington, Del. |
|---|---|---|
| [21] | Appl. No. | 815,907 |
| [22] | Filed | Apr. 14, 1969 |
| [45] | Patented | June 29, 1971 |
| [73] | Assignee | Gulf & Western Industrial Products Company<br>Grand Rapids, Mich. |

[54] EXTRUSION APPARATUS WITH FLOW DIVERTER
7 Claims, 11 Drawing Figs.

[52] U.S. Cl. .................................................... 72/270, 18/30
[51] Int. Cl. ...................................................... B21c 33/00
[50] Field of Search ........................................... 72/262, 270, 271; 18/30 NV, 30 AC, 30 AM

[56] References Cited
UNITED STATES PATENTS

| 3,050,084 | 8/1962 | Palfey ........................... | 18/30 |
| 3,500,501 | 3/1970 | Johansson ..................... | 18/30 |

FOREIGN PATENTS

| 1,150,189 | 1/1958 | France ......................... | 18/30 NV |
| 735,995 | 8/1955 | Great Britain ................ | 18/30 NVM |

Primary Examiner—Charles W. Lanham
Assistant Examiner—Michael J. Keenan
Attorney—Meyer, Tilberry and Body ABSTRACT: An extrusion apparatus of the type including a screw-type feeder which supplies material to a die block for extrusion therethrough. The apparatus is provided with a diverting valve assembly between the feeder and the die block. The valve assembly is arranged to divert flow from the feeder around the die block so that during a die change operation the material flow rates and temperatures are maintained. Consequently, following the die change, extrusion can immediately resume without the necessity of waiting while the material is again brought to the proper conditions.

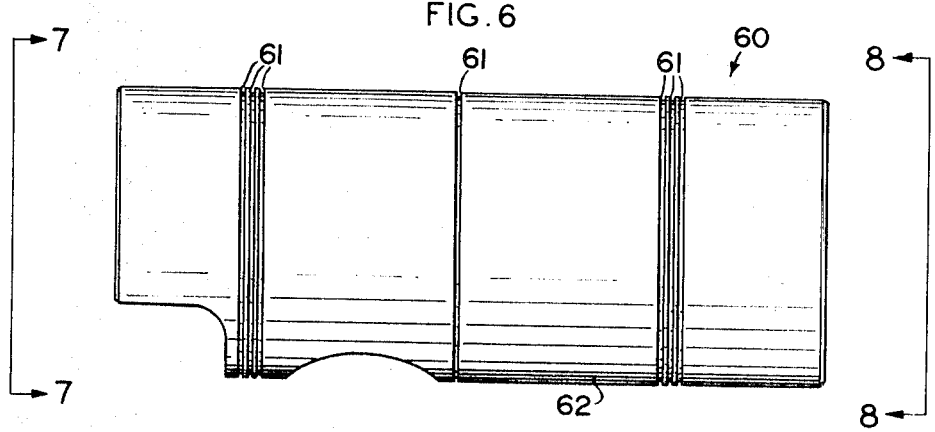
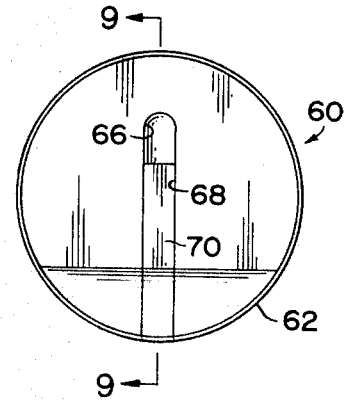
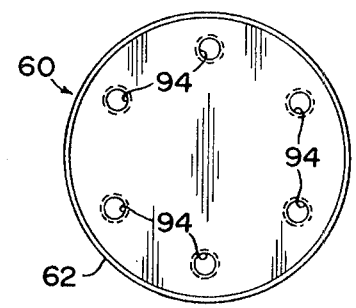
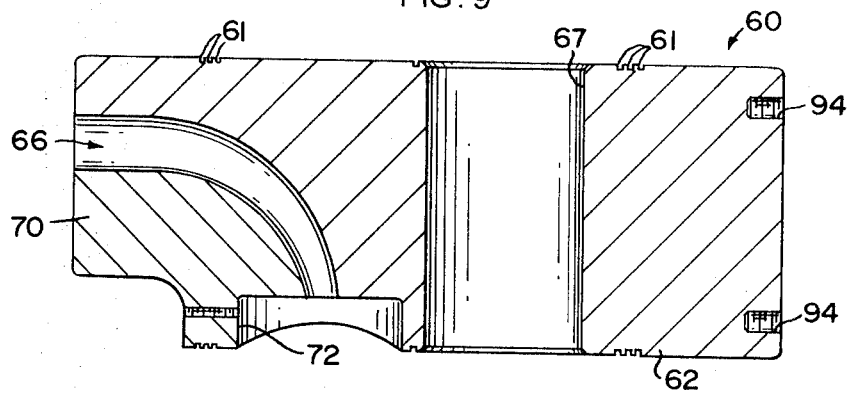
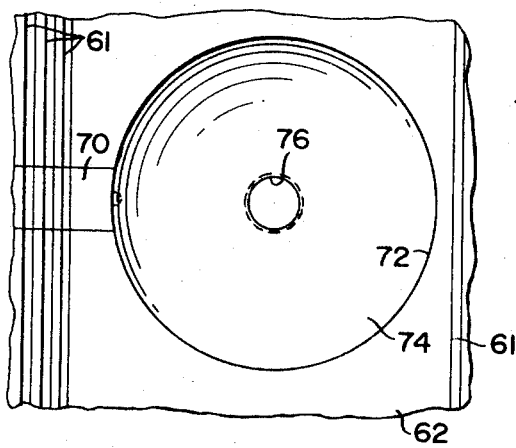
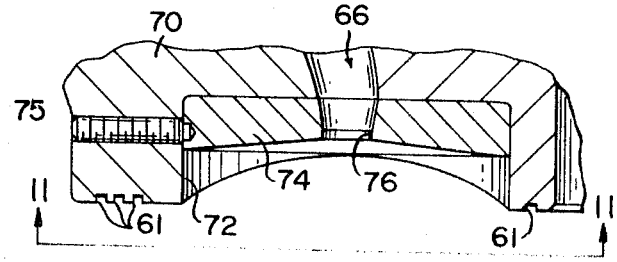

EXTRUSION APPARATUS WITH FLOW DIVERTER

The subject invention is directed toward the extrusion art and, more particularly, to an improved apparatus which permits material feed to continue while extrusion dies are being changed or maintenance is being performed.

The invention is especially suited for use in lead extrusion apparatus and will be described with particular reference thereto; however, it will be appreciated that the invention is capable of broader application and could be used in extrusion apparatus for many other materials.

In most presently available lead extrusion machines, a screw type lead feeder is directly connected to a die block which houses the required extrusion dies. In order to change dies or perform maintenance operations on the machine, it is necessary to stop operation of the feeder.

As is well known, to assure proper extrusion of the lead it must be supplied to the dies under closely controlled conditions of temperature, flow rate, etc. With the prior apparatus, each die change or maintenance operation resulted in substantial down time of the machine, since an extended period was required to return the lead in the feeder to the proper conditions for satisfactory extrusion. Further, a considerable amount of the product which was extruded following each restart was not usable and had to be scrapped.

The present invention provides an arrangement which overcomes the above problems and allows lead flow through the feeder to be maintained during a die change operation. Additionally, the invention permits immediate resumption of extrusion following a die change.

In accordance with the invention, an extrusion apparatus of the type including a die block with at least one extrusion die and a screw feeder for supplying material to the die at predetermined conditions is provided with means intermediate the feeder and the die for selectively permitting flow directly from the feeder to the die along a first path or, alternately, directing flow away from the die along a second path arranged to provide resistance to flow generally similar to flow through the first path and the die. Preferably, the means include provisions for maintaining the material at a predetermined temperature in either of the selected positions.

Accordingly, a primary object of the invention is the provision of an extrusion apparatus having means for diverting material flow around the extrusion die.

Yet another object is the provision of apparatus of the type described which allows a continuous flow of material to be maintained during die change operations.

A still further object is the provision of an apparatus of the foregoing type wherein the material being extruded can be maintained under desired conditions during the period in which flow is diverted around the die.

Yet a further object is the provision of apparatus of the type discussed which is simple to construct and reliable in operation.

These and other objects and advantages will become apparent from the following description when read in conjunction with the accompanying drawings wherein.

Figure 3:
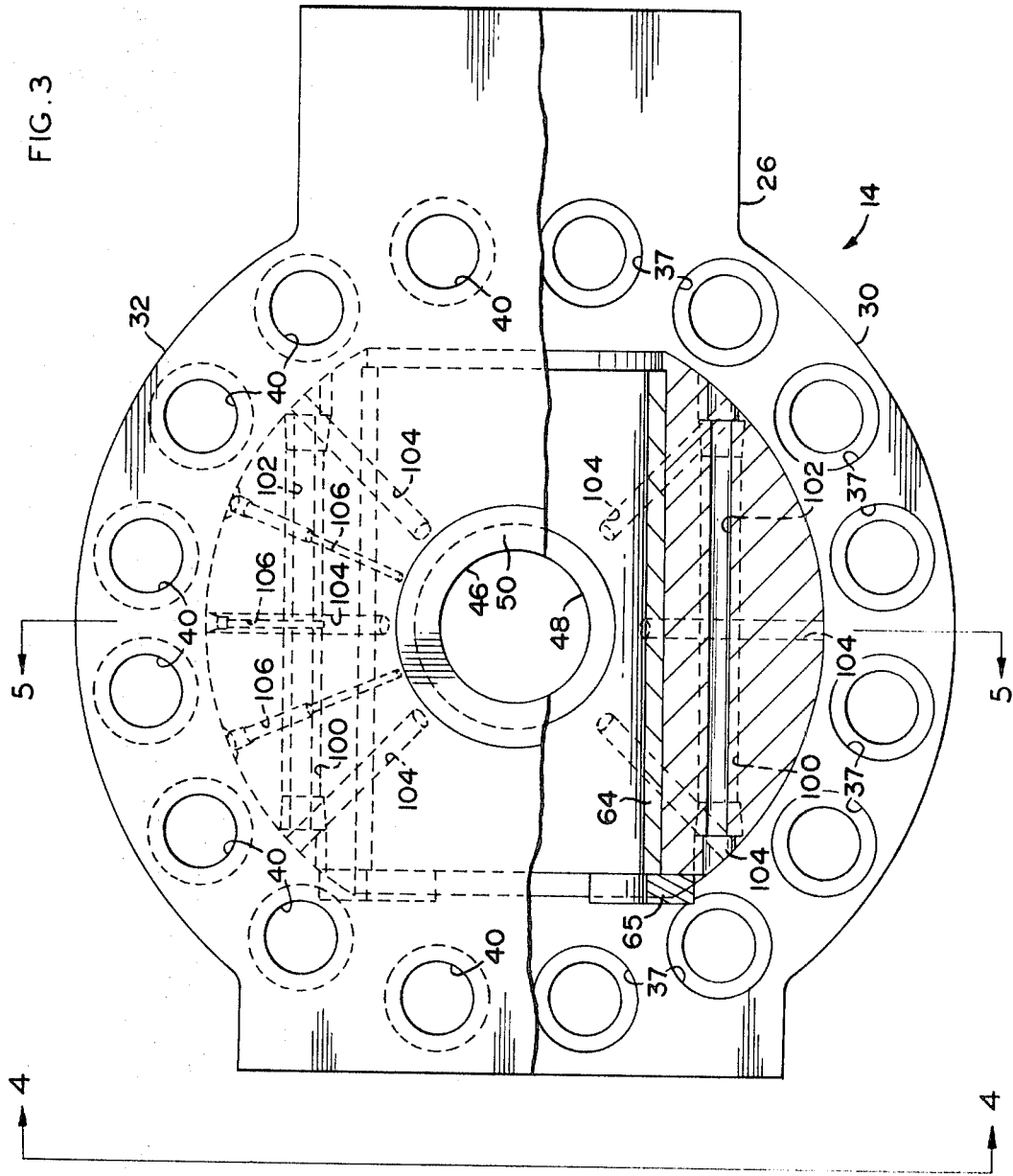
FIG. 3 is a cross-sectional view taken on line 3-3 of FIG. 1.
Figure 4:
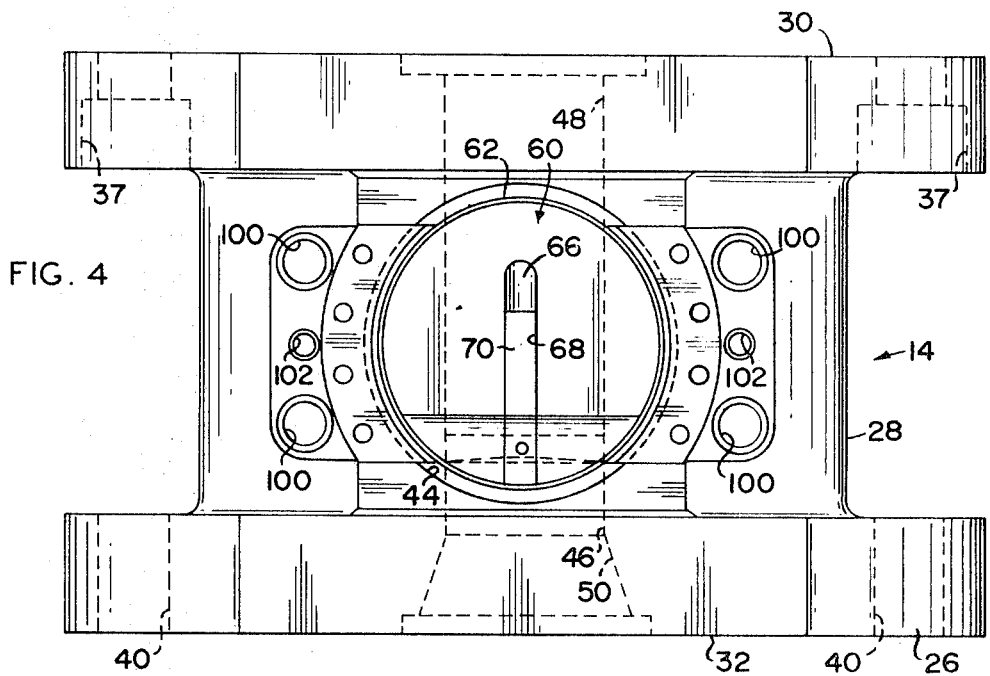
Figure 5:
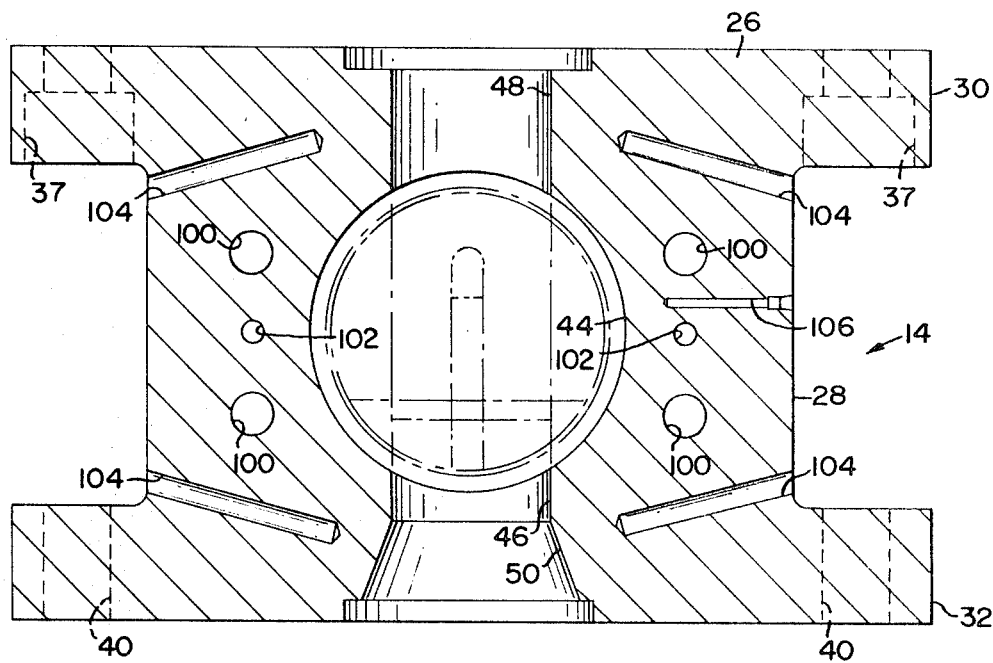

FIGS. 4 and 5 are cross-sectional views taken on lines 4-4 and 5-5, respectively, of FIG. 3;

FIG. 6 is a detail showing of the diverting element per se;

FIGS. 7 and 8 are views taken on lines 7-7 and 8-8, respectively, of FIG. 6;

FIG. 9 is a longitudinal section through the diverting element;

FIG. 10 is an enlarged section through the inlet to the diverting passageway of the diverting element showing an orifice plate member positioned therein; and FIG. 11 is an enlarged view taken on line 11-11 of FIG. 10.

Figure 1:
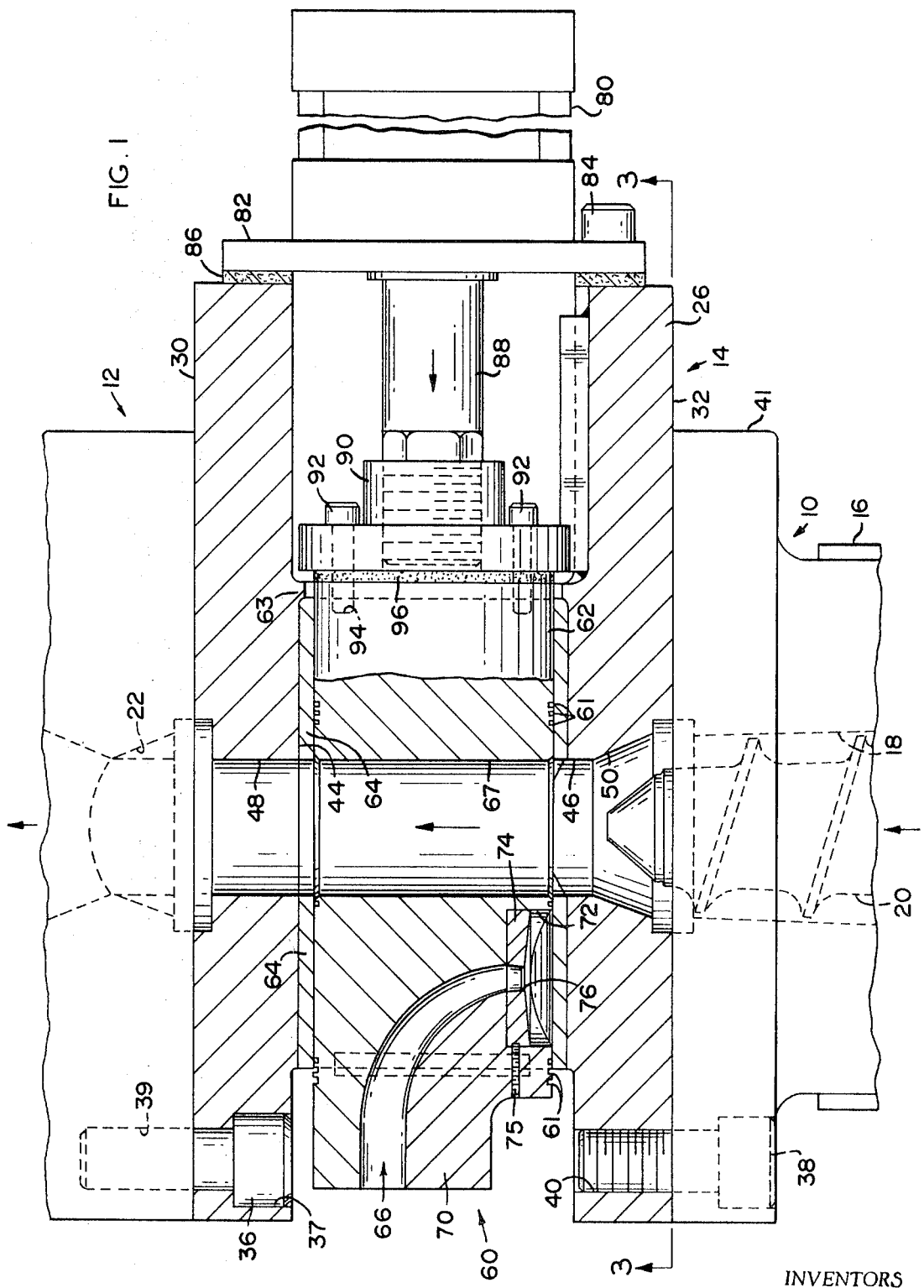
FIG. 1 is a plan view, partially in section, showing the overall relationship between the die block, the flow diverting mechanism, and the feeder.

Referring more particularly to the drawings wherein the showings are for the purpose of illustrating a preferred embodiment of the invention only and not for the purpose of limiting same, FIG. 1 shows, in plan view, the relationship between the outlet end of screw-feeder 10 and the die block 12, with the diverting assembly 14 positioned therebetween.

The extruding apparatus under consideration is a relatively conventional assembly designed for extruding lead. The feeding portion of the apparatus comprises a conventional screw-type feeder 10 of which, only the discharge or outlet end is shown. The feeder includes the usual housing or feed barrel 16 provided with a central bore 18 in which is rotatably mounted the feed screw 20. Normally, in apparatus of the type under consideration, the feeder 10 is directly connected to the die block 12 so that the bore or passageway 18 is directly connected to the supply passageway 22 of the die block. In FIG. 1, only the inlet end of the die block is shown; however, it is to be understood that at the outlet end of the passageway 22 the necessary extrusion die or dies are removably mounted.

According to the subject invention, means are provided between the outlet of the feeder 10 and the inlet 22 of the die block 12 to permit the flow from the feeder to pass directly through to the inlet of the die block or, alternately, to be diverted laterally to collect the extruded material or return it to the input end of the feeder. According to the invention, the diverting assembly includes a main body or housing 26 which, in the embodiment under consideration, is preferably a heavy walled casting. The body 26 includes a generally cylindrical center portion 28 (See FIGS. 3—5) having enlarged flanges 30 and 32 formed on opposite ends thereof. The flanges 30 and 32 are arranged to be connected to the die block 12 and the extruder 10, respectively. In the subject embodiment, housing 14 is connected to the die block 12 by a plurality of machine screws 36 which pass through recessed openings 37 in flange 30 into threaded openings 39 in the die block 12. The housing 14 is similarly connected to the outlet end of the extruder 10 by machine screws 38 which pass through openings in a flange 41 formed on the outlet of the feeder. Threaded openings 40 formed in flange 32 receive the screws 38.

Figure 2:
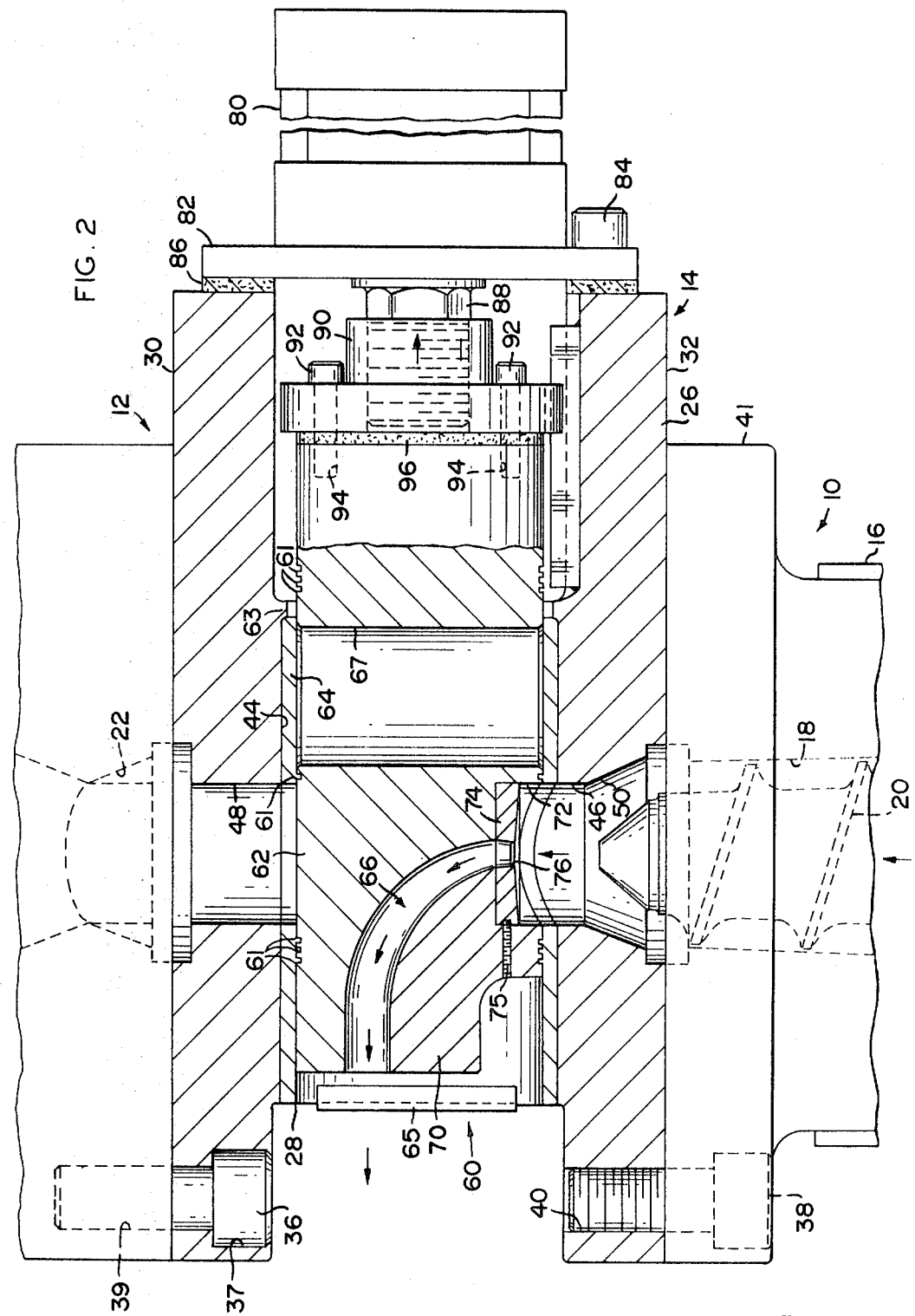
FIG. 2 is a view similar to FIG. 1 showing the diverting mechanism in its flow diverting position.

Referring to FIGS. 1, 2, and 5, it will be noticed that a bore 44 is formed diagonally through the cylindrical center section 28 of the body 26. Second openings 46, 48 are formed diagonally through the body between flanges 30 and 32 to connect with bore 44. The opening 46 includes a tapered section 50 which is concentric with the outlet of the feeder. The opening 48 is aligned with the opening 50 and the inlet 22 to the die block 12. Consequently, a main flow path is provided through the central portion 28 so that lead from the extruder can pass directly to the die block.

According to the invention, a diverting element 60 is positioned in the bore 44 and arranged to selectively permit flow directly from the extruder 10 to the die block 12 or, alternately, to divert the flow from the extruder transversely of the main flow path. The diverting element 60 could have a variety of specific configurations; however, the preferred construction is as best shown in FIGS. 6 through 10. As shown, the diverter 60 comprises a cylindrical body 62 of a diameter to be received within a bore 44 of the housing 26. Referring to FIG. 1, it is seen that there is preferably a machined wear sleeve 64 positioned in close engagement with the internal wall of the bore 44 and arranged to closely receive the outer diameter of the body 62. As shown, the sleeve 64 is maintained in position within bore 44 by a circumferential shoulder 63 and a retainer plate 65. The internal surface of the sleeve is relatively smooth to receive the body 62 in sealing relationship. Additionally, the body 62 is provided with a plurality of labyrinth-type, circumferential grooves 61.

Referring again to FIGS. 6—11, it will be noted that the body 62 has a diagonally extending opening 67 with a diameter substantially equal to the diameter of the previously mentioned openings 44, 46 and 48. Accordingly, when the diverting member is in the position shown in FIG. 1, lead flow passes directly from the outlet of the feeder directly to the inlet of the die block.

Also formed in the body 62 is curved passageway 66. Referring to FIGS. 7 and 9 it is seen that the passageway 66 is formed by a slot 68 milled in the end of the body 62 and a plate 70 inserted therein to define the particular curved opening shown in FIG. 9. The plate 70 is firmly affixed in the body in any convenient manner, such as by welding. The inlet to passageway 66 is provided with a machined recess 72. As best shown in FIGS. 1, 2 and 10, an orifice plate 74 is positioned within the opening 72 and is releasably retained therein by a set screw 75a. According to the invention, the opening 76 in the orifice plate 74 is sized so that the total frictional resistance to flow through the orifice plate and the passageway 66 is substantially equal to the total frictional resistance to flow through the main passageway and through the outlet of the dies and die blocks 22. Consequently, when the flow is diverted through the passage 66 there is no change in the quantity of lead exiting from the extruder. This is particularly important when it is realized that the problem of maintaining the lead at the proper conditions for satisfactory extrusion is substantially increased by changes in flow rate.

In addition to maintaining constant flow, the assembly is arranged to maintain the lead passing therethrough at a desired temperature suitable for satisfactory extrusion. For this reason, the housing 26 is provided with means for modifying the temperature of the assembly. Referring to FIGS. 3—5, there are shown four passageways 100 which are formed parallel to the bore 44 and extended entirely through the body portion 28. The inlet and outlet ends of the passageways are tapped so as to permit them to be readily connected to a source of coolant such as water. Although not shown, the coolant supply would, of course, be provided with means to regulate coolant flow. Additionally, parallel openings 102, and radially extending openings 104, are provided for receiving electrical resistance heaters. The temperatures within the housing can be monitored and controlled through the use of thermocouples positioned in the radial openings 106 (See FIGS. 3 and 5).

A variety of means may be used for reciprocating the diverter element 60; however, according to the preferred embodiment, the means utilized comprise a double acting hydraulic cylinder 80 which is mounted on the right-hand end of the housing 14 as viewed in FIGS. 1 and 2. As can be seen, the hydraulic cylinder 80 is connected to the housing 14 by a mounting plate 82 and machine screws 84. It should also be noted that the mounting plate and cylinder 80 are thermally insulated from the housing 14 by insulating gasket 86 formed from asbestos or similar material. The piston rod 88 is connected to a mounting flange 90 which is in turn connected to the right-hand end of the diverter member 60 by plurality of machine screws 92. As best shown, in FIG. 8, the cap screws 92 are received in third openings 94 formed in the body portion 62 of the diverter 60. Mounting flange 90 is also thermally insulated from the diverter member 60 by a gasket of insulating material 96. This arrangement prevents heat from being transmitted to the hydraulic cylinder 80.

The hydraulic cylinder 80 is, of course, connected to a source of hydraulic pressure so that it can be selectively actuated to shift the diverting member. As is apparent, this arrangement permits the flow of lead from the extruder to be rapidly shifted away from the die block 12 so that maintenance and/or die changes can take place thereon. Further, during the shifting, there is substantially no change in the rate of material coming from the extruder. Consequently, after the dies are changed, extruding can begin immediately.

The invention has been described in great detail sufficient to one of ordinary skill in the extrusion art to make use of the same. Obviously, modifications and alterations of the preferred embodiment will occur to others upon a reading and understanding of the specification, and it is our intention to include all such modifications and alterations as part of our invention insofar as they come within the scope of the appended claims.

We claim:

1. In an extrusion apparatus of the type including a die block with at least one extrusion die and a screw feeder for supplying material to the die at predetermined conditions:

the improvement comprising diverting means intermediate the feeder and the die, said diverting means being movable between first and second positions and having first and second passageway means therein for selectively permitting flow directly from the feeder to the die through said first passageway means or directing the flow away from the die through said second passageway means;

said second passageway means including flow restrictor means for providing a resistance to flow through said second passageway means greater than the resistance provided by said first passageway means and generally equal to the resistance to flow through the first passageway means and the die together.

2. The apparatus as defined in claim 1 wherein said diverting means includes a slide valve member having said first and second passageway means formed therein.

3. The apparatus as defined in claim 1 wherein said diverting means includes a cylindrical slide valve member having said first and second passageway means formed therein, said first passageway for permitting flow directly from said feeder to said die block when in said first position.

4. The apparatus as defined in claim 1 including power means for moving said diverting means between said first and second positions.

5. In an extrusion apparatus of the type including a die block with at least one extrusion die and a screw feeder for supplying material to the die at predetermined conditions:

the improvement comprising diverting means intermediate the feeder and the die, said diverting means being movable between first and second positions and having first and second passageway means therein for selectively permitting flow directly from the feeder to the die through said first passageway means or directing flow away from the die through said second passageway means;

said second passageway means including flow restrictor means for providing a resistance flow generally similar to the resistance to flow through the first passageway means and the die;

power means for moving said diverting means between said first and second positions, said diverting means including a slide valve member having said passageway means therein, said power means adapted to reciprocate said slide valve member along a path perpendicular to a line extending between said feeder and said die block.

6. The apparatus as defined in claim 5 wherein said power means is a fluid cylinder.

7. The apparatus as defined in claim 5 wherein said slide valve member is a cylinder and said first of said passageway means extends diametrically therethrough and the second of said passageway means extends between the side and an end of said cylinder.